United States Patent

Dourson et al.

[11] Patent Number: 5,070,971
[45] Date of Patent: Dec. 10, 1991

[54] MOLDED PISTON FOR A HYDRAULIC DAMPER

[75] Inventors: Stephen E. Dourson, Dayton; Gary L. Johnston, Pleasant Hill; Kurt E. Olson, West Carrollton, all of Ohio

[73] Assignee: General Motors Corporation, Detroit, Mich.

[21] Appl. No.: 513,399

[22] Filed: Apr. 23, 1990

[51] Int. Cl.$^5$ .................................................. F16F 9/00
[52] U.S. Cl. ................................... 188/317; 188/322.22
[58] Field of Search ........................ 188/322.15, 322.22, 188/316, 317, 318, 319, 320, 311, 281–282, 129, 313; 267/120, 124, 127, 129, 64.11, 64.13; 92/172, 170.1

[56] References Cited

U.S. PATENT DOCUMENTS

| | | |
|---|---|---|
| 2,507,267 | 5/1950 | Patriquin . |
| 2,723,846 | 11/1955 | Holder et al. ............... 188/317 X |
| 2,774,447 | 12/1956 | De Carbon ................... 188/317 X |
| 2,821,268 | 1/1958 | De Carbon ................... 188/317 X |
| 2,912,069 | 11/1959 | Dillenburger . |
| 3,109,520 | 9/1961 | Vossieck . |
| 3,343,833 | 9/1967 | Fader ........................ 188/322.22 X |
| 3,484,096 | 12/1969 | Mahoney ..................... 188/317 X |
| 3,747,714 | 7/1973 | De Carbon ................... 188/317 |
| 3,777,861 | 12/1973 | Breed ........................ 188/317 |
| 4,307,873 | 12/1981 | Möders ....................... 267/124 X |
| 4,532,856 | 8/1985 | Taylor ....................... 267/64.13 X |

Primary Examiner—Douglas C. Butler
Attorney, Agent, or Firm—A. Michael Tucker

[57] ABSTRACT

A molded piston for a shock absorber is formed as a cylindrical member having a central, axial opening for receiving a piston rod. A plurality of unrestricted axial openings are provided in the piston radially outbound of the central opening and aligned substantially parallel to the axis of the piston to serve as primary flow passages. A plurality of axial grooves are provided on the circumference of the piston to serve as secondary flow passages. A flexible, circumferential valving ring is integrally molded at one end of the piston for permitting only one-way flow of fluid through the secondary flow passages as the piston reciprocates in an inner cylinder.

2 Claims, 1 Drawing Sheet

MOLDED PISTON FOR A HYDRAULIC DAMPER

BACKGROUND OF THE INVENTION

1. FIELD OF THE INVENTION

The present invention relates generally to hydraulic dampers for vehicles and, in particular, is concerned with a molded piston for mounting on a piston rod in a hydraulic damper.

2. DESCRIPTION OF THE RELATED ART

A typical hydraulic shock absorber or strut includes a piston and piston rod subassembly which reciprocates in an inner cylinder during compression and rebound of the damper. The piston may contain a valving package to vary the flow of hydraulic fluid from first and second chambers in the inner cylinder, resulting in desired damping characteristics.

The piston is generally formed as a metallic cylindrical member requiring several machining and cutting operations. An inner passage is bored through the piston to receive the valving package and permit the flow of fluid. Oftentimes, the valving package is retained within the piston by a crimping procedure. A sealing band can be provided around the outer circumference of the piston to provide a seal against the inner surface of the inner cylinder. In other constructions, a piston can be formed by various elements into a substantially cylindrical package capable of reciprocating in the inner cylinder.

The art continues to seek improvements. It is desirable to provide an economical piston which can be easily mounted on conventional piston rods. The piston should be simple in construction and provide valving for fluid to pass between upper and lower chambers of an inner cylinder of a shock absorber.

SUMMARY OF THE INVENTION

The present invention includes a molded piston for use with a hydraulic damper. The piston is a cylindrical body having a plurality of fluid passages to permit fluid to flow between upper and lower chambers in an inner cylinder of a shock absorber. The piston can be easily mounted on a piston rod with conventional fastening techniques. Preferably, the piston is formed from a low-friction material and provides an integral valving arrangement to control fluid flow.

In a preferred embodiment, the present invention includes a molded piston for a shock absorber. The piston is a cylindrical member having a central, axial opening for receiving a piston rod. A plurality of unrestricted axial openings are provided in the piston radially outbound of the central opening and aligned substantially parallel to the axis of the piston to serve as primary flow passages. A plurality of axial grooves are provided on the circumference of the piston to serve as secondary flow passages. A flexible, circumferential valving ring is integrally molded at one end of the piston for permitting only one-way flow of fluid through the secondary flow passages as the piston reciprocates in an inner cylinder.

DETAILED DESCRIPTION OF A PREFERRED EMBODIMENT

Figure 1:
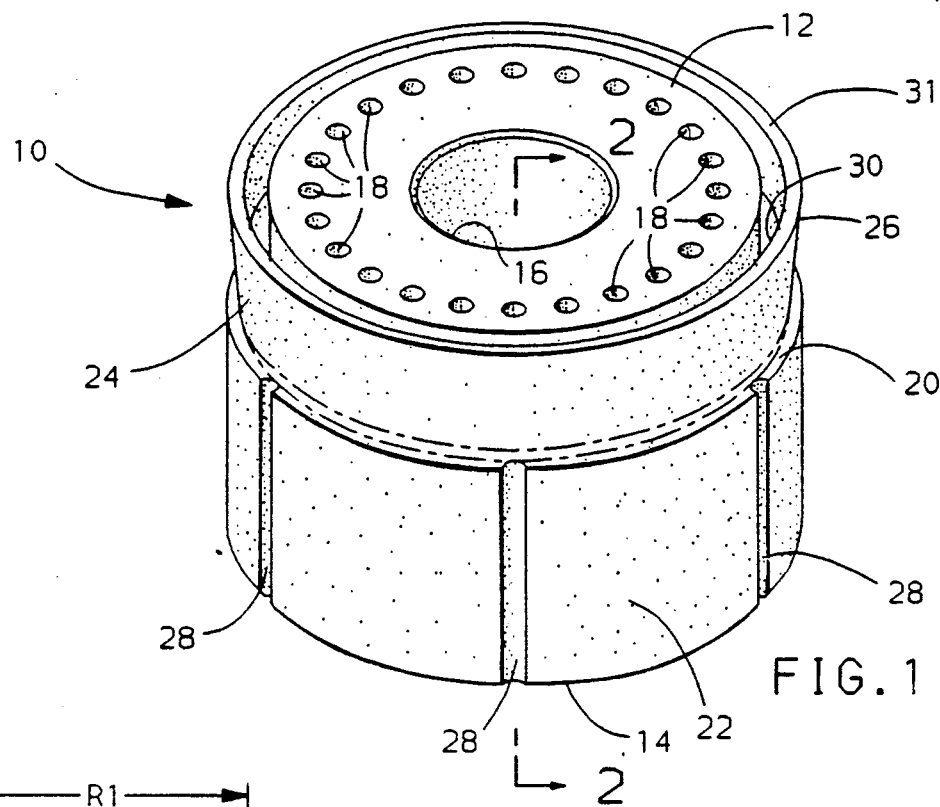
FIG. 1 is an enlarged perspective view of a molded piston according to the present invention illustrating a plurality of primary flow passages provided through the body, a plurality of secondary flow passages provided on the outer circumference of the body and a flexible valving ring formed by a relief groove and a circumferential channel.
Figure 2:
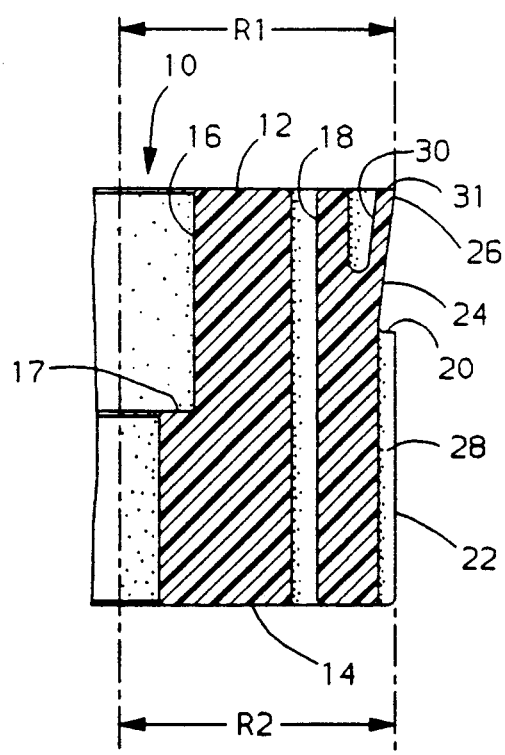
FIG. 2 is a sectional view taken along line 2—2 of FIG. 1 illustrating a primary flow passage, a secondary flow passage and the flexible valving ring.

A molded piston indicated generally at 10 is illustrated in FIG. 1. The piston 10 is a substantially cylindrical member having a top surface 12, a bottom surface 14 and a central axial opening 16. If desired, the central opening can include a seat 17 as illustrated in FIG. 2. Preferably, the piston 10 is molded as an integral member from a flexible plastic material, such as polytetrafluoroethylene or a polytetrafluoroethylene-filler combination.

A plurality of unrestricted axial openings or primary flow passages 18 are provided through the piston 10. The primary flow passages 18 are provided radially outbound of the central opening 16 and are aligned substantially parallel to the axis of the piston 10.

Adjacent the top surface 12, an annular channel 20 is provided in the smooth circumference 22 of the piston 10. As illustrated best in FIG. 2, the channel 20 is formed by an inwardly tapered circumferential wall 24 which terminates at a predetermined length. The uppermost portion 26 of the wall 24 has a radius R1 greater than or equal to the radius R2 of the bottom surface 14. As the wall 24 extends downwardly toward the bottom surface 14, the radius constantly decreases.

On the outer circumference 22 of the piston 10, a plurality of axial grooves or secondary flow passages 28 are provided. The upper end of each secondary flow passage 28 terminates at the channel 20. Preferably, the secondary flow passages 28 are aligned substantially parallel to the axis of the body 10. However, other orientations for the secondary flow passages 28 are within the scope of this invention.

An annular relief groove 30 is provided in the top surface 12 of the piston 10 radially outbound of the primary flow passages 18. A valving ring 31 is formed and bounded on one side by the relief groove 30 and bounded on the opposite side by the tapered wall 24. The relief groove 30 is of sufficient depth and volume so that at least the uppermost portion 26 of the valving ring 31 is flexible or yieldable toward the axis of the piston 10 as described below.

Figure 3:
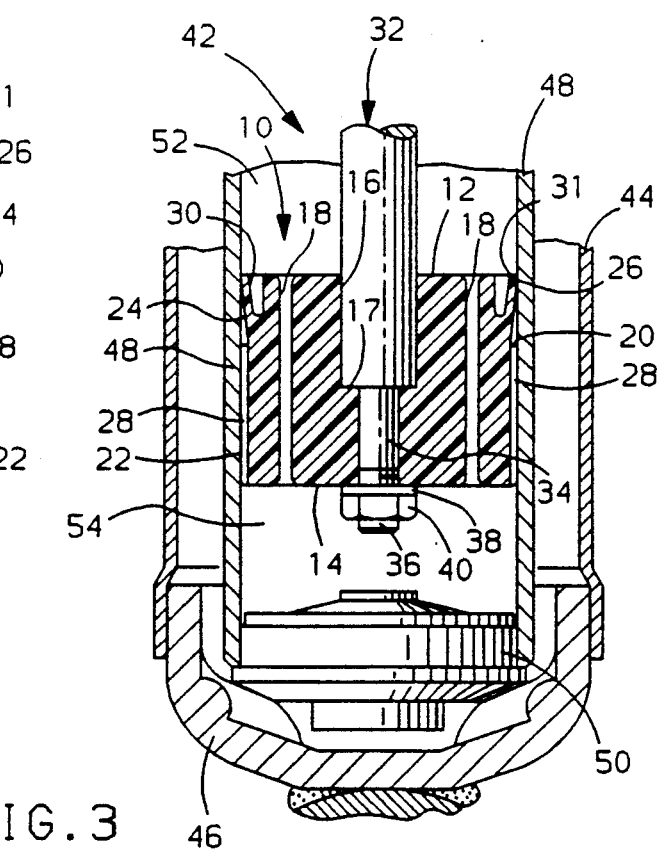
FIG. 3 is a sectional view of a shock absorber incorporating the present molded piston of FIGS. 1 and 2.

The piston 10 is mounted on a piston rod 32 as illustrated in FIG. 3. An extension 34 provided at the lower end of the piston rod 32 terminates in a threaded portion 36. After the piston rod 32 is inserted into the axial opening 16 and fitted onto the seat 17, a washer 38 and a nut 40 are utilized to removably mount the piston 10 on the piston rod 32.

The piston 10 and piston rod 32 are mounted in a twin-tube shock absorber indicated generally at 42 and illustrated in FIG. 3. In other embodiments, the piston 10 and piston rod 32 can be mounted in a mono-tube or multi-tube shock absorber. The shock absorber 42 includes a reservoir tube 44 closed by a base cup 46 and surrounding an inner cylinder 48. The inner cylinder 48 is closed by a well-known base valve assembly 50.

In operation, the piston 10 divides the interior of the fluid-filled inner cylinder 48 into an upper chamber 52 and a lower chamber 54. During the compression stroke of the shock absorber 42, the piston 10 and piston rod 32 are forced downwardly toward the base valve assembly 50. Fluid in the lower chamber 54 passes through the primary flow passages 18 as substantially laminar flow into the upper chamber 52. Additionally, fluid is forced into the secondary flow passages 28, thereby filling the channel 20. As fluid pressure increases in the channel 20, the valving ring 31 flexes inwardly as permitted by the relief groove 30 so that the fluid can pass into the upper chamber 52. The diameter and number of the primary and secondary flow passages 18 and 28, as well as the volume of the channel 20, can be varied to achieve a desired compression damping rate. A molded radius R1 of the piston 10 slightly greater than radius R2 maintains the seal provided by the valving ring 31 even after wear caused by reciprocation against the inner cylinder 18.

During the rebound stroke of the piston rod 32, the piston 10 travels upwardly away from the base valve assembly 50. Fluid from the upper chamber 52 passes through the primary flow passages 18 into the lower chamber 54. However, the uppermost portion 26 of the valving ring 31 acts as a fluid check valve and forms a seal to prevent fluid from entering the channel 20 and the secondary flow passages 28. In this manner, the rebound damping rate can be varied from the compression damping rate. Fluid is permitted to enter the lower chamber 54 from the reservoir tube 44 through the base valve assembly 50 in a well-known manner.

The present invention includes an economical, molded piston 10 for use with conventional hydraulic dampers. The piston 10 includes integrally molded valving to vary the compression and rebound damping rates without requiring any elements to be assembled onto the piston 10.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. A one-piece piston for mounting on a piston rod and controlling fluid flow in an inner cylinder of a hydraulic damper as the piston and piston rod reciprocate, comprising:
   (a) a molded cylindrical body including an axis circumference and radius slidably mounted in the inner cylinder;
   (b) a central, axial opening in the body for receiving the piston rod;
   (c) a plurality of unrestricted axial openings formed in the body radially outbound of the central opening and aligned substantially parallel to the axis of the body for providing primary flow passages;
   (d) a circumferential channel formed in a central portion of the body;
   (e) a plurality of axial grooves formed on the circumference of the body, each groove beginning at a first end of the body and terminating at the channel, for providing secondary flow passages;
   (f) a flexible, circumferential wall integrally formed with the body for permitting only one-way fluid flow through the axial grooves as the piston reciprocates, the wall beginning at the channel, tapering outwardly to a radius at least equal to the radius of the body and terminating at a second end of the body; and
   (g) an annular relief groove formed in an end surface of the body radially inbound of the flexible wall for permitting the flexible wall to deflect radially inwardly to permit the passage of fluid through the axial grooves.

2. The piston specified in claim 1 wherein the integral body and flexible wall are formed from a low friction material.

* * * * *